United States Patent Office 3,467,664
Patented Sept. 16, 1969

3,467,664
PROCESS OF MANUFACTURING BIPYRIDYLS WITH IMPROVED DILUENTS
Philip Brook Dransfield and Allan William Olleveant, Runcorn, England, assignors to Imperial Chemical Industries Limited, London, England, a corporation of Great Britain
No Drawing. Filed Mar. 14, 1966, Ser. No. 533,776
Claims priority, application Great Britain, Mar. 17, 1965, 11,347/65
Int. Cl. C07d 31/02
U.S. Cl. 260—296     14 Claims

ABSTRACT OF THE DISCLOSURE

There is provided an improvement in the process for the manufacture of bipyridyls by oxidising a metal-pyridine interaction product in the presence of an organic diluent. The improvement comprises using as an organic diluent one which has dielectric constant greater than 25. With the present invention, an operator of the process has greater freedom of choice of diluents and enables the use of alternate diluents but still obtaining the advantages formerly regarded as obtainable only with the known ether diluents. Also improved results are obtained. Representative of the diluents having dielectric constants greater than 25 are acetonitrile, dimethylsulphoxide, N:N-dimethylformamide and morpholine.

---

This invention relates to the manufacture of organic bases, more particularly bipyridyls.

In our U.K. application No. 42,616/62, it has been proposed to manufacture bipyridyls by a process which comprises oxidising the metal-pyridine interaction product formed from a dissolved form of the metal. In this process there has been described in particular the step of carrying out the oxidation of the metal-pyridine interaction product using oxygen gas (for example in the form of air or air enriched with oxygen) and in the presence of a liquid organic diluent, particularly an ether and preferably an ether derived from a glycol. All the ethers so described contain alkoxy groups.

We have now found that in the said process of U.K. application No. 42,616/62 liquid diluents other than the ethers therein described can usefully be employed in the oxidation stage.

Thus according to the present invention we provide as a modification or extension of the process of U.K. application No. 42,616/62 a process for the manufacture of bipyridyls which comprises taking a metal-pyridine interaction product and oxidising it in the presence of an organic diluent having a high dielectric constant, preferably greater than 25. The metal-pyridine interaction product used should preferably be one formed from a dissolved form of the metal.

We find that the use of a liquid diluent of high dielectric constant greatly facilitates production of bipyridyls in the oxidation stage, and promotes efficiency in the overall conversion of pyridine to bipyridyl in our process.

For use in the process of the present invention, the organic diluent should be substantially unreactive towards the metal-pyridine interaction product and should not react during the oxidation step (for example with sodium peroxide) to form any troublesome or dangerous by-products. The solvent accordingly is preferably free from active hydrogen atoms. As examples of organic diluents which may be used in the process of our invention there may be mentioned in particular nitriles, especially aliphatic mononitriles for example acetonitrile or methyl cyanide (dielectric constant: 37.5); aliphatic sulphoxides for example dimethylsulphoxide (dielectric constant: 42.6); and carboxylic amides in which both hydrogen atoms of the amide group have been replaced by hydrocarbon or other substituents. As examples of such amides, in which no hydrogen atoms are attached to the amide nitrogen, there may be mentioned in particular that di-N-substituted derivatives of aliphatic monocarboxylic acid amides; suitable compounds include formamide derivatives, for example dimethyl formamide (dielectric constant 33), though derivatives of other amides for example dimethyl acetamide may also be used if desired.

In general it is preferred to use a diluent which is liquid at the temperature to be used for the reaction. It is possible however to use a diluent which is solid at the required reaction temperature provided it is soluble in the particular reaction mixture employed. An example of this is the use of a mixture of diluents or the addition of another material which can suitably depress the freezing point of the desired diluent.

Apart from the selection of the organic diluents as discussed above, the general requirements, procedures, reaction conditions and the like to be employed are essentially those already described in greater detail in application No. 42,616/62.

The main variations therein described are summarised as follows.

The pyridine is preferably pyridine itself, though alkyl pyridines may also be used. The metal is preferably an alkali metal, for example sodium or potassium, but an alkaline earth metal (particularly calcium) can also be used. The metal is preferably dissolved in a substantially anhydrous liquid medium containing ammonia; this may be liquid ammonia itself or a mixture of liquid ammonia with a liquid diluent, which may be an inert diluent or the diluent specified in the present invention. Conveniently the metal is dissolved first in liquid ammonia, and this solution is mixed with diluent and pyridine (in either order) and then oxidised. The ammonia may be removed before the oxidation, but this is not essential.

The diluent we now specify may be used in a wide range of proportions but we prefer to use between 4 and 10 parts by weight for each part of the metal-pyridine interaction product in the oxidation stage. The oxidation is best carried out at temperatures below 20° C., and preferably below 0° C.; between —20° C. and —30° is particularly preferred.

In general, the present invention allows the operator greater freedom of choice of diluent, and enables him to use alternative diluents while still obtaining the advantages formerly regarded as obtainable only with the ethers specified in our earlier U.K. application No. 42,616/62. In some instances, depending upon the precise reaction conditions employed, slightly improved results are obtained.

The invention is illustrated but not limited by the following examples in which the parts and percentages are by weight.

Example 1

70 gm. of clean sodium metal were dissolved in 1000 ml. of liquid ammonia at —45° C. To this stirred solution 236.7 gm. of dry pyridine (water content 0.03%) were added slowly, thus producing a pale yellow precipitate of sodium-pyridine interaction product. The suspension was diluted with 472 gm. of N:N-dimethyl formamide which had been purified by fractional distillation.

The mixture was added over 2–2½ hours to 1021 gm. of pure N:N-dimethyl formamide cooled to —25° C. and agitated at high speed (1500 r.p.m.) while air was blown continuously through the mixture at a rate of 240 litres per hour. The addition of the suspension was adjusted to keep the oxygen content of the emerging gas stream between 4 to 6%, and the ammonia was allowed to evaporate so as to keep the temperature at −25° C.

The reaction mixture was then allowed to warm to atmospheric temperature and the residual ammonia was allowed to evaporate. The resulting residue (which consisted of a pale brown organic solution from which a flocculent pale-buff precipitate partly settled) was found by analysis to contain 6.2% of 4:4-bipyridyl and 5.3% of pyridine. This corresponded to 43% conversion of pyridine to 4:4-bipyridyl and the yield of 4:4-bipyridyl based on pyridine consumed was 94% of theory.

The pyridine was recovered by filtration and distillation, and the 4:4-bipyridyl was recovered by distillation from the residues remaining after removal of the solvent. 202.8 gm. of the reaction mixture was filtered and the solid was washed with 178 gm. of N:N-dimethyl formamide. The 335 gm. of total filtrate contained by analysis 3.0% pyridine and 3.3% of 4:4-bipyridyl, corresponding to 96% recovery of pyridine and 89% recovery of 4:4-bipyridyl. 250 gm. of this filtrate was distilled under reduced pressure to remove the solvent. The last traces of solvent were removed by addition of 150 gm. of water and further distillation. The residue weighed 42 gm. and was found by analysis to contain 16.2% 4:4-bipyridyl. The distillate weighed 317.5 gm. and was found by analysis to contain 1.8% pyridine. The overall recovery of 4:4-bipyridyl was 84% and overall recovery of pyridine was 84%.

Example 2

The procedure of Example 1 was repeated with variations of the diluent and of the diluent/pyridine ratio. The results are summarised in the following table.

| Diluent | Ratio of Diluent/Pyridine by weight | Yield of 4:4-bipyridyl | |
|---|---|---|---|
| | | As percent Efficiency on Sodium | As Percent Efficiency on Pyridine |
| Dimethyl formamide | 4:1 | 39.0 | 78 |
| Do | 7:1 | 44.5 | 88 |
| Do | 12:1 | 47.5 | 91 |
| Do | 6:1 | 50.0 | 94 |
| Acetonitrile | 8:1 | 32.5 | 95 |
| Do | 8:1 | 31.6 | 98 |
| Dimethyl sulphoxide | 8:1 | 35 | 98 |

What we claim is:

1. In a process for the manufacture of bipyridyls by oxidising a metal-pyridine interaction product in the presence of an organic diluent the improvement comprising using an oragnic diluent having a dielectric constant greater than 25, and which diluent is substantially unreactive towards the metal-pyridine interaction product and does not react during the oxidation step, and at least 4 parts by weight of said diluent being used for each part by weight of the said metal-pyridine interaction product, whereby increased yields are obtained.

2. Process as claimed in claim 1, wherein the organic diluent has a dielectric constant greater than 25.

3. Process as claimed in claim 1 wherein the organic diluent is a lower alkylnitrile.

4. Process as claimed in claim 3 wherein the organic diluent is acetonitrile.

5. Process as claimed in claim 1 wherein the organic diluent is a lower alkylsulphoxide.

6. Process as claimed in claim 5 wherein the organic diluent is dimethylsulphoxide.

7. Process as claimed in claim 1 wherein the organic diluent is a lower alkylcarboxylic amide in which both the hydrogen atoms of the amide group have been replaced by lower alkylsubstituents.

8. Process as claimed in claim 1 wherein the organic diluent is a di-N-lower alkylformamide.

9. Process as claimed in claim 8 wherein the organic diluent is N:N-dimethylformamide.

10. Process as claimed in claim 1 wherein there is used a sodium-pyridine interaction product.

11. Process as claimed in claim 1 wherein the metal-pyridine interaction product is made from a dissolved form of the metal.

12. Process as claimed in claim 1 wherein the metal-pyridine interaction product is derived from pyridine itself.

13. Process as claimed in claim 1 wherein the oxidation is carried out at a temperature below 20° C.

14. Process as claimed in claim 1 wherein the organic diluent is used in a proportion between 4 and 10 times the weight of the metal-pyridine interaction product.

References Cited

UNITED STATES PATENTS 3,227,723  1/1966  Baines et al. _____ 260—296
3,272,835  9/1966  Dransfield et al. ____ 260—296
3,272,836  9/1966  Duffy et al. _____ 260—296

HENRY R. JILES, Primary Examiner

ALAN L. ROTMAN, Assistant Examiner